Patented Apr. 12, 1949

2,467,197

UNITED STATES PATENT OFFICE 2,467,197

AZEOTROPIC DISTILLATION OF STYRENE

Karl H. Engel, Teaneck, N. J., assignor to Allied Chemical & Dye Corporation, New York, N. Y., a corporation of New York No Drawing. Application September 6, 1945, Serial No. 614,803

13 Claims. (Cl. 202—42)

This invention relates to the production of substantially pure styrene or a hydrocarbon oil of high styrene content from hydrocarbon oils of relatively low styrene content.

Styrene is found in low concentration in hydrocarbon oils, particularly aromatic hydrocarbon oils, produced in such operations as coal distillation, gas production, and petroleum cracking and reforming. An aromatic hydrocarbon oil containing varying proportions of styrene in admixture with other aromatic hydrocarbons is also obtained when styrene is produced synthetically, e. g., by cracking or dehydrogenation of alkyl benzenes. From these hydrocarbons oils, styrene cuts may be obtained by fractional distillation, which cuts may contain as much as about 50% styrene, the remainder consisting chiefly of like-boiling alkyl benzenes such as the xylenes and ethylbenzene, and sometimes also minor amounts of aliphatic and naphthenic hydrocarbons boiling close to styrene.

As above indicated, styrene cannot be readily separated from the close-boiling hydrocarbons with which it is generally associated by ordinary fractional distillation. It has been proposed heretofore to recover substantially pure styrene by bringing about polymerization of the styrene in the styrene oil, separating the non-styrene components from the polymerized styrene by distillation, and then cracking the polystyrene by application of heat, whereupon a substantial part of the polystyrene depolymerizes to form monomeric styrene. As this process has generally been carried out in the published prior art, the yield of monomeric styrene has been low, and a styrene product is produced in which the styrene is still admixed with close-boiling hydrocarbons.

It is an object of this invention to provide a distillation process for separating styrene in good yield from the oils in which it occurs.

It is a further object of this invention to provide a process in which substantially pure styrene may be obtained in a single distillation operation from the usual styrene fractions which may contain, for example, about 50 wt. % styrene, obtained by fractional distillation of styrene-containing oils produced in coke-oven operations, water-gas and oil-gas production, the cracking and reforming of petroleum oils, and styrene synthesis.

It is another object of the invention to provide a process for the recovery of styrene from aromatic oils containing styrene and like-boiling alkyl benzenes such as ortho-xylene, meta-xylene and para-xylene.

I have discovered that substantially pure styrene or a hydrocarbon oil greatly enriched in styrene may be separated from a styrene oil containing styrene along with alkyl benzenes not readily separable from styrene by ordinary fractional distillation, by carrying out fractional distillation of a mixture of such a styrene oil and a glycol derivative of the group consisting of glycol ethers and ether-esters boiling within the range of 120° to 150° C., preferably an ethylene glycol ether or ether-ester having a boiling point within the range of about 120° to 150° C. Such a glycol derivative, I have found, on addition to a styrene oil, as above described, containing other hydrocarbons besides styrene, forms azeotropes of a minimum-boiling type with the various hydrocarbon constituents of the oil; i. e., when a mixture of the hydrocarbon oil and the glycol derivative is distilled, various hydrocarbon-glycol derivative mixtures distill over at temperatures lower than the distillation temperatures of the hydrocarbon and the glycol derivative making up such mixtures. The styrene oil fractions subjected to azeotropic distillation may have a boiling range of from 130° to 150° C. at a pressure of 760 mm. of mercury.

Moreover, I have made the surprising discovery that the azeotropic mixtures thus formed between a glycol derivative, as above described, and alkyl benzenes contained in the styrene oil, have substantially lower distillation temperatures than the azeotropic mixtures of glycol derivative and styrene, so that upon fractional distillation of the glycol derivative and hydrocarbon oil mixture, the alkyl benzene components of the oil are distilled off first as azeotropic mixtures with the glycol derivatives, and material whose hydrocarbon component consists of substantially pure styrene or highly enriched styrene may be distilled off as a higher boiling fraction or may be left as still residue.

The various glycol derivatives suitable for use in the process of my invention, i. e. boiling within range 120° to 150° C. and comprising ethers and ether-esters, differ among each other in their ability to effect large spreads between the boiling temperatures of the styrene azeotropes and the non-styrene azeotropes they form. These glycol derivatives differ further in that they form azeotropic vapor mixtures containing higher or lower proportions of hydrocarbons to glycol derivative. Taking these factors into account, I have found that, among the various ethylene glycol derivatives suitable for use in the process of my invention, the following ethylene glycol ethers are particularly advantageous: (1) ethylene glycol monomethyl ether, boiling point 124.3° C., (2) ethylene glycol monomethyl ether acetate, boiling point 143.0° C., and (3) ethylene glycol monoethyl ether, boiling point 135.1° C. Ethers and ether-esters of propylene and iso-butylene glycols boiling within the range 120° to 150° C. are also suitable.

Examples of styrene-containing oils which, as above indicated, may be obtained by fractional distillation of the light aromatic hydrocarbon oils recovered in gas production, coke oven operation, petroleum cracking and reforming, styrene synthesis, or similar operations involving synthesis or pyrolysis of aromatic hydrocarbons containing aliphatic substituents include: (1) drip oil, the oil which settles out from carburetted water-gas or oil-gas mains; (2) the light oils recovered by scrubbing of coke oven gas, carburetted water gas and oil gas; (3) the lower boiling fractions distilled from coal tar, carburetted water-gas tar and oil-gas tar; (4) cracked and reformed petroleum oils; (5) the products of styrene synthesis involving, for example, the pyrolysis of alkyl benzenes; and (6) the products of similar processes involving the synthesis or pyrolysis of aromatic hydrocarbons containing aliphatic substituents, e. g., the product of pyrolysis of a polystyrene resin.

From such styrene-containing materials, upon fractional distillation, close-cut styrene fractions boiling (at 760 mm. of mercury pressure), for example, through the range 140° to 146° C., may generally be obtained. Such fractions contain varying proportions of styrene. From the first four sources named above, for example, styrene fractions containing up to about 50% styrene by weight are generally obtained; from the other two sources, styrene fractions of higher styrene content may be obtained. In each case, the styrene fraction generally contains hydrocarbons having boiling points close to that of styrene, for example, the xylenes, ethylbenzene, other alkylbenzenes, and aliphatic (including naphthenic) hydrocarbons boiling in the neighborhood of the boiling point of styrene. The term "like-boiling" compounds, with reference to styrene, as used herein refers to these non-styrene hydrocarbons generally associated with styrene in styrene fractions and to other compounds present in styrene oils which upon fractional distillation of the oils tend to distil with the styrene. Styrene fractions produced as above described are, in general, suitable for azeotropic distillation with the specified glycol derivatives as above described, in accordance with my invention, to produce substantially pure styrene or a hydrocarbon oil greatly enriched in styrene.

In practicing my invention, I have generally found it advantageous to subject the styrene crude which is to be azeotropically distilled to preliminary purification. For example, such purification may, particularly in the case of styrene oils recovered from drip oils, light oils, and tar distillates, consist of washing with sulfuric acid followed by neutralization and distillation. Other methods of purifying styrene oils are known in the art. Such purification may be carried out either prior to or following the above-described fractionation to produce a close-cut styrene fraction.

The fractional distillation of azeotropic mixtures from a styrene hydrocarbon oil, to which a glycol derivative as above described has been added as azeotropic agent, may be carried out as a simple batch or continuous distillation in which the entire amount of agent needed may be added to the styrene oil before fractionation. Alternatively, the agent may be added gradually in continuous or intermittent fashion during the course of the fractionation. In the latter case the agent recovered from the distillate during fractionation, as described below, may be returned to the still and an amount of agent may thus be employed in the process substantially less than the total amount supplied to the still during distillation. One method of bringing about continuous recovery of agent from the distillate during fractionation and its return to the still is to have water present in the upper part of the fractionation column, as more fully described below. The water may be looked upon as an auxiliary azeotropic agent in this case.

The amount of primary agent, i. e. glycol derivative, added to the styrene oil to be subjected to azeotropic distillation, should be regulated so that there will not be an undue amount remaining in the still residue when fractional distillation is discontinued. However, there should be enough agent present so that the azeotropic ratio of agent to hydrocarbon in the vapor within the still and the fractionating column will be maintained, at least while non-styrene hydrocarbons are being distilled over. As above pointed out, the various azeotropic agents differ in that they form azeotropic distillates containing higher or lower proportions of hydrocarbons to agent. For example, in the case of ethylene glycol monomethyl ether, one of the preferred glycol derivatives employed as azeotropic agent in the process of my invention, I have found the volume ratio of hydrocarbons to agent to be roughly 7 to 8 in the vapor mixture of hydrocarbons and agent that passes up from the still. In the case of ethylene glycol monomethyl ether acetate, another of my preferred agents, I have found the volume ratio of hydrocarbons to agent to be about 9 to 1 in the vapor. In the case of ethylene glycol monoethyl ether, I have found the volume ratio of hydrocarbons to agent to be about 7 to 3. The volume ratio of oil to agent in the case of any other glycol derivative of the type above described as suitable for use in the process of my invention, may be readily determined by a preliminary simple distillation of a mixture of agent and hydrocarbon oil, and the amount of such other agent subsequently used in an azeotropic separation process, as herein described, may be governed accordingly. I have found that low ratios of oil to agent, for example a ratio indicating that more agent than oil is present in the azeotropic vapor mixture, in general permit a sharper separation of non-styrene hydrocarbons from styrene and are therefore advantageous, even though because of the low ratio a somewhat greater quantity of material must be distilled over for the production of a given quantity of styrene.

The azeotropic distillation of the styrene oil with the glycol derivative azeotropic agent, with or without water as an auxiliary agent, may be carried out either batchwise or continuously. In a batchwise fractionation not employing water as auxiliary agent, the distillate at first consists almost entirely of the azeotropic mixture of glycol derivative and non-styrene oil, but as fractionation proceeds and the temperature approaches the distillation temperature of the glycol derivative-styrene azeotrope, the styrene content of the distillate gradually increases. The course of the fractionation may be followed by taking samples of the distillate and testing them for their styrene content. When the distillate tests sufficiently high in styrene, the styrene product may then either be withdrawn from the still or taken as a final distillate fraction.

In continuous operation, the styrene oil and azeotropic agent may be continuously introduced into an intermediate portion of the fractionating column. A product whose oil component is substantially pure styrene, or a greatly enriched styrene oil, may be continuously withdrawn from the still and an azeotropic mixture of non-styrene hydrocarbon and agent may be continuously taken off overhead. This distillate may be condensed, the agent separated as described below, and the separated agent returned to the fractionating column along with the entering styrene oil.

In batchwise distillation employing water as auxiliary agent, a charge of styrene oil, primary agent (glycol derivative), and water is placed in the still and subjected to fractional distillation.

The water forms azeotropes of the so-called eutectic type with the hydrocarbon oils carried upward in the column in azeotropic mixtures with the primary agent. Inasmuch as the water-hydrocarbon azeotropes have lower boiling points than the corresponding primary agent-hydrocarbon azeotropes, the primary agent, in general, is substantially replaced by water. Applied in limited proportions, the water is completely volatilized from the still charge and is eventually found in substantial proportions only in the upper part of the fractionating column and in the distillate. As the distillate is condensed, it stratifies into a water layer and a hydrocarbon layer, generally substantially free from primary agent. The water layer is continuously returned to the top of the column. In the upper part of the column, therefore, water in the liquid state along with some condensed hydrocarbon flows downwardly countercurrent to water, hydrocarbon and glycol derivative vapors passing upwardly through the column.

This water flowing downwardly eventually is again vaporized, its vapors displacing selectively the primary agent vapors in azeotropic mixtures with hydrocarbons in the upper portion of the still, the displaced primary agent vapors in turn being condensed and flowing downward in countercurrent to rising fresh hydrocarbon vapors. Thus, water, as well as the primary agent, i. e. the glycol derivative, is completely retained in the still system, largely retained in the fractionating column. By selecting the proper proportion of water to column capacity, water in liquid or vapor phase is confined to generally one-fifth of the column space, at the top, the lower four-fifths holding the primary agent as liquid or vapor, a larger column space being required for the more difficult separation of styrene from other hydrocarbons. As in the batchwise distillation above described, distillation is continued until a styrene product of desired purity is obtained either as still residue or final distillate fraction.

The distillation employing water as auxiliary azeotropic agent may also be carried out continuously by continuously introducing a mixture of the styrene oil and primary azeotropic agent into an intermediate portion of the fractionating column of a still and column system wherein a mixture of styrene oil, primary agent and water is being fractionated; water for the fractionation is introduced continuously or intermittently into the top of the column. As in the batchwise procedure above described, all or the greater part of the water needed for fractionation may be provided by continuous return of the water component of the condensed distillate to the top of the fractionating column.

The degree of fractionation (determined by the number of plates employed in the fractionating column, the point at which batchwise fractionation is discontinued and the styrene content of the hydrocarbon oil being treated) is controlled so as to give a final product of particular styrene content. I have found it advantageous when subjecting a closecut styrene fraction to azeotropic distillation, as herein described, to continue fractionation until the distillate coming over or the material remaining in the still has at least a 95% styrene content (by weight), based on the oil component of the material. By more exhaustive azeotropic fractionation or refractionation of a styrene-enriched oil, styrene concentrations of 98% to 100% may be obtained.

I have found it advantageous to carry out the distillation at still temperatures not exceeding about 65° C., with correspondingly low vapor pressures not above about 30 mm. of mercury in the system, if no polymerization inhibitor is used. If effective inhibitors are used, such as hydroquinone, phenylhydrazine, hematoxylin, or tertiary butyl catechol, higher temperatures, up to about 100° C. still temperature, and correspondingly higher vapor pressures not exceeding about 100 mm. of mercury may be maintained in the system without appreciable loss of styrene, whereas higher temperatures lead to increasing polymerization of the styrene.

When carrying out the process of my invention in such a way that the oil distillate fractions obtained contain glycol derivative, i. e. when carrying out the distillation without the auxiliary agent (water) the distillate fractions are treated to recover the glycol derivative. This may be conveniently done by washing with water to dissolve out the glycol derivative. A non-styrene hydrocarbon oil useful for solvent purposes may thus be recovered from the more volatile distillate fractions produced in the above azeotropic distillation, and substantially pure styrene or a greatly enriched styrene fraction may be recovered from the material which is either withdrawn from the still or distilled over as a last distillate fraction, as above described. The water solution of glycol derivative obtained in the washing operations may be subjected to fractional distillation for separation of the glycol derivative, and the glycol derivative thus recovered may be reused in the process.

Alternatively, the agent may advantageously be recovered from the hydrocarbon oils in which it is dissolved by an azeotropic distillation of the agent-hydrocarbon solution with water as the azeotropic agent. This may be carried out by charging the agent-hydrocarbon solution to the still with a relatively small proportion of water and subjecting the mixture to fractional distillation. The early distillate consists of azeotropic mixtures of hydrocarbon and water substantially free of glycol derivative agent, or azeotropic mixtures of hydrocarbon, water and relatively small proportions of agent. This distillate is condensed, whereupon it stratifies into two layers. The lower aqueous layer is continuously returned to the column, whereas the upper hydrocarbon layer is returned only in part to maintain column equilibrium, the remainder being withdrawn. This is continued until nearly all hydrocarbon has been removed from the still charge. When such a point has been reached, distillation is continued as before, but the water layer is now withdrawn while the small quantity of hydrocarbon layer is returned to the still. This is continued until the water has been removed. At this point, the still residue consists of practically pure glycol derivative agent with only a small quantity of hydrocarbon admixed therewith. This residue may be reused directly, or it may be subjected to a simple distillation to obtain a colorless product, and this product may then be employed as primary agent in subsequent azeotropic distillations for separation of styrene.

As above pointed out, when a sufficiently limited quantity of agent has been used, or when water has been employed as an auxiliary azeotropic agent, as above described, there may be little or no agent remaining in the styrene product, and in these cases, therefore, it is only necessary to treat the non-styrene hydrocarbon oil for removal of agent.

The styrene product may advantageously be subjected to a simple distillation, particularly if it has been withdrawn as still residue rather than final distillate fraction, and a water-white monomeric styrene product of 98% to 100% purity may thus be obtained.

The following examples are illustrative of the process of my invention:

Example 1

A styrene oil of coal tar origin having the following characteristics was employed in this run.

| | |
|---|---|
| Specific gravity at 25° C | 0.867 |
| Boiling range, bulb distillation | 133°–149° C. |
| Paraffinic hydrocarbons | 2.3% |
| Styrene content | 19% |

The oil was agitated with 5% of its weight of sulfuric acid, 50° Bé., at room temperature, for one hour. The spent sulfuric acid was taken off, and the treatment repeated with a fresh charge of acid. The oil was separated, neutralized with a dilute solution of alkali, washed with water, and dried.

To produce a material of higher styrene content, the washed oil was subjected to fractional distillation through a fractionating column of approximately 25-plate efficiency, under pressures of 12–18 mm. Condensers were supplied with cooling water at 0°–5° C. to minimize vapor losses from condensates. In conducting such initial concentration of the styrene content of the styrene oil, the distillation is preferably carried out under absolute pressure not exceeding 20 mm. of mercury.

Running samples of the condensate were taken and their refractive indices determined. Styrene percentages of the samples were estimated from refractive indices relation between pure styrene and oils freed of styrene.

Distillates containing less than 21% of styrene were returned to process as too lean; other fractions were combined. The resulting fraction represented 39 volume parts of the crude oil. Its refractive index was 1.515 at 20° C., and its estimated styrene content was 43%, the remainder of the fraction being constituted predominantly of o-xylene and smaller amounts of m-xylene and p-xylene. Material thus prepared is herein designated as styrene concentrate.

The fractionating still was charged with 190 volume parts of the styrene concentrate containing 43% of styrene and with 110 volume parts of ethylene glycol monomethyl ether of commercial grade. A trace of hydroquinone was added to retard polymerization of styrene.

The mixture was carefully fractionated under a pressure of 13–20 mm. of mercury, removing lower boiling distillates of low styrene content. The volume ratio of oil to agent was 58 to 42 in the early stages of the distillation and changed gradually to 45 to 55. Progress of the separation of hydrocarbons other than styrene was followed by taking running samples of distillates, removing agent from these samples by thorough extraction with water and by determining the refractive index of the dry oil. When the latter had risen to 1.542 the separation was considered complete and fractionation stopped. The agent at this stage was practically exhausted from the still charge. The still residue consisting principally of styrene was washed with water to remove the last traces of agent, dried, and distilled simply under reduced pressure. The distillation left practically no residual polymeric substance. The distillate, 57 volume parts, had a refractive index of 1.544 at 20° C. (pure styrene 1.547). The purity of the material is estimated as 96% or better.

Fractions having a refractive index lower than about 1.505 (indicating low styrene content) preferably are combined and worked up for recovery of agent. Fractions of higher refractive index but below 1.544 (indicating intermediate styrene content) are returned to the still for refractionation, or they may be added to a subsequent batch of styrene concentrate. It will be appreciated that these distillate fractions are enriched in xylene. By proper selection of the distillate fractions, a distillate highly enriched in o-xylene may be recovered as a valuable by-product of the process.

The ethylene glycol monomethyl ether was recovered from the lower boiling fractions by the following procedure: The mixture used contained 57 volume parts of hydrocarbon oils, of low styrene content, and 43 volume parts of ethylene glycol monomethyl ether. 200 volume parts of this mixture and 8 volume parts of water were placed in the fractionating still. Column equilibrium was established by completely refluxing the distillate. At atmospheric pressure, the water occupied the top of the column to approximately one-fifth of the column length. The condensate was collected in a trap which permitted settling in two phases and continuous return of the lower aqueous layer. The upper layer of hydrocarbons was partly returned to the top of the column, to maintain equilibrium, and partly withdrawn. The fractionation temperature at the top of the column varied from 93° to 99° C. during removal of the hydrocarbons. The azeotropic mixture, when withdrawn without separation of phases, was found to consist of 60 volume parts of oil to 40 volume parts of water.

When nearly all hydrocarbons had been removed the aqueous distillate was removed from the settling trap, the remaining hydrocarbon layer being returned until the water was exhausted. A small quantity of hydrocarbon oils was drawn off. The remaining still residue consisting practically of pure ethylene glycol monomethyl ether was distilled at full forward flow.

The separation of hydrocarbon oils, water and ethylene glycol monomethyl ether was practically quantitative.

The total recoveries in the distillation of non-styrene hydrocarbon oils for separation of agent were as follows:

| | Volume parts |
|---|---|
| Hydrocarbons | 114 |
| Ethylene glycol monomethyl ether | 79 |
| Aqueous distillate | 11 |

The aqueous distillate contained an additional 4 volume parts of ethylene glycol monomethyl ether. This may be recovered by reusing the aqueous distillate cyclically in further distillations of the same nature.

*Example 2*

The fractionating still was charged with 200 volume parts of the styrene concentrate containing 43% of styrene and with 100 volume parts of ethylene glycol monoethyl ether. A small amount of hydroquinone was added to retard polymerization of styrene.

The mixture was carefully fractionated under a pressure of 7 to 17 mm. of mercury, removing lower boiling distillates of low styrene content. The volume ratio of oil to agent was 70 to 30 in the early stages of the distillation and changed gradually to 56 to 44. The progress of the distillation was followed as before by taking running samples of distillates, washing with water, and determining the refractive index of the dry oil. When the latter had risen to 1.544, the separation was considered complete and fractionation stopped. The still residue as in Example 1 was washed with water to remove traces of agent, dried, and simply distilled under reduced pressure. The distillate, 44 volume parts, had a refractive index of 1.544 at 20° C. (pure styrene, 1.547). Thus, the purity of the styrene was 96% or better.

The fractions low in styrene may be worked up for recovery of agent, either by washing with water, or by azeotropic distillation as in Example 1. The fractions of intermediate styrene content are returned to process.

*Example 3*

Another styrene concentrate was prepared by fractionation of drip oil crude solvent. This concentrate contained about 50% styrene.

A fractionating still equipped with a 50 foot by 4 inch packed column was charged with about 27,240 parts by weight (30,000 parts by volume) of the 50% styrene concentrate and with about 35,840 parts by weight (37,060 parts by volume) of ethylene glycol monomethyl ether.

The mixture was carefully fractionated with an absolute pressure of 60 mm. mercury at the head of the column and distillates of increasing styrene content were taken. The volume ratio of oil to agent was 55 to 45 in the early stages of the distillation and changed gradually to 39 to 61. Distillation was continued as in Example 1.

The portion of the distillate containing 98% of styrene was refined by washing with 50° Bé. sulfuric acid, neutralizing, and distilling. A water-white product of better than 98% purity was thus obtained.

Intermediate fractions, for example, those containing from about 20% to 97% styrene, may be returned to the process either for further fractionation to produce a 50% styrene concentrate, or for further azeotropic distillation, depending upon the styrene content of the fractions. The early fractions low in styrene may be treated for recovery of agent as in Example 1 above.

*Example 4*

A fractionating still equipped with a 36" x 1" Stedman column with Stedman packing #112 was charged with 500 parts by volume of styrene concentrate containing about 50% styrene with 75 parts by volume of ethylene glycol monomethyl ether and with about 10 parts by volume of water.

The mixture was carefully fractionated under an absolute pressure of 35 mm. mercury and distillate fractions of water and oil were taken, in which fractions the oil component contained increasing amounts of styrene. The water layer of the distillate was continuously returned to the top of the column. All the water tended to accumulate in about the upper fifth of the column where it acted in a dual capacity: (1) it condensed ethylene glycol monomethyl ether from the hydrocarbon vapors about to pass out of the column, and (2) it steam distilled hydrocarbon oil out of the top of the column. The ethylene glycol monomethyl ether was thus retained in the still and column.

In this run, somewhat more intermediate was formed since the presence of water in the upper part of the fractionating column cut down somewhat on fractionating efficiency.

The final fraction taken in this case was refined as in Example 3. A water-white product of at least 97% purity was thus obtained.

*Example 5*

The fractionating still was charged with 200 volume parts of a styrene concentrate containing 37% of styrene and with 300 volume parts of acetate of ethylene glycol monomethyl ether.

The mixture was carefully fractionated under an absolute pressure of 25 mm. mercury. The volume ratio of oil to agent was 43 to 7 in the early stages of the distillation and changed gradually to about 5 to 45 in the last stages. Distillation was continued as in Example 4. The final fraction gave a water-white product of about 95% purity.

Since certain changes may be made in carrying out the above process without departing from the scope of the invention, it is intended that all matter contained in the above description shall be interpreted as illustrative and not in a limiting sense.

I claim:

1. The method of producing a hydrocarbon oil enriched in styrene from an oil containing styrene and at least one like-boiling alkyl benzene, which comprises fractionally distilling a mixture of the oil and a glycol derivative of the group consisting of glycol ethers and glycol ether-esters boiling within the range of about 120° to 150° C., recovering a distillate fraction containing a higher proportion of like-boiling alkyl benzene than the initial oil, and recovering a higher-boiling product containing a higher styrene content than the initial oil.

2. The process defined in claim 1 wherein the glycol derivative is ethylene glycol monomethyl ether.

3. The process defined in claim 1 wherein the glycol derivative is ethylene glycol monomethyl ether actate.

4. The process defined in claim 1 wherein the glycol derivative is ethylene glycol monoethyl ether.

5. A process for producing an oil of enriched styrene content from an initial oil containing styrene and at least one like-boiling alkyl benzene, which comprises fractionally distilling a mixture of the initial oil with an ethylene glycol ether boiling within the range of about 120° to 150° C., recovering as distillate a mixture consisting predominantly of ethylene glycol ether and like-boiling alkyl benzene, and recovering as a higher-boiling product an oil containing a higher styrene content than the initial oil.

6. The process of claim 5 wherein the mixture of oil and glycol ether is fractionally distilled in the presence of styrene polymerization inhibitor at a temperature of not more than about 100° C.

7. A process for recovering styrene of at least 95% purity from an oil containing styrene and at least one like-boiling alkyl benzene, which comprises fractionally distilling said oil at an absolute pressure not above 100 mm. of mercury, recovering a distillate fraction containing a higher proportion of styrene than said oil, the non-styrene content of said fraction consisting predominantly of at least one like-boiling alkyl benzene inseparable from the styrene by conventional fractional distillation, fractionally distilling said distillate fraction at a pressure not above 100 mm. of mercury in admixture with a glycol derivative of the group consisting of glycol ethers and glycol ether-esters boiling within the range of about 120° to 150° C. thereby forming a distillate containing said alkyl benzene and glycol derivative, continuing such distillation in admixture with glycol derivative until the styrene content of the hydrocarbon portion of the distillation residue is at least 95%, and recovering said distillation residue separately from said distillate.

8. That method of recovering relatively pure styrene from crude mixtures comprising styrene and contaminants of similar boiling point, primarily aromatic hydrocarbons having the empirical formula $C_8H_{10}$, which consists of subjecting a mixture containing crude styrene to distillation in the presence of glycol monoetheyl ether as a distillation assistant, recovering from said distillation at least two fractions, one consisting of substantially pure styrene and some of the distillation assistant and the other consisting of a mixture of contaminants and distillation assistant and separating the distillation assistant from the styrene-containing fraction.

9. That method of recovering relatively pure styrene from crude mixtures comprising styrene and contaminants of similar boiling point, primarily aromatic hydrocarbons having the empirical formula $C_8H_{10}$, which consists of subjecting a mixture containing crude styrene to distillation under pressure substantially less than atmospheric in the presence of glycol monoethyl ether as a distillation assistant, recovering from said distillation at least two fractions, one consisting of substantially pure styrene and some of the distillation assistant and the other consisting of a mixture of contaminants and distillation assistant from the styrene-containing fraction.

10. The process of recovering a concentrated styrene fraction from a mixture thereof primarily with aromatic hydrocarbons having the empirical formula $C_8H_{10}$, which comprises subjecting such mixture to azeotropic distillation in the presence of ethylene glycol monoethyl ether, removing as the overhead from such distillation, a binary azeotrope primarily of aromatic hydrocarbons having the empirical formula $C_8H_{10}$ and the ethylene glycol monoethyl ether and recovering the concentrated styrene fraction from such distillation.

11. That method of recovering relatively pure styrene from crude mixtures comprising styrene and contaminants of similar boiling point, primarily aromatic hydrocarbons having the empirical formula $C_8H_{10}$, which consists in subjecting a mixture containing crude styrene to distillation in the presence of glycol monoethyl ether to the extent of not less than about 25% by volume of the crude styrene mixture, recovering from said distillation at least two fractions, one consisting of substantially pure styrene and some of the distillation assistant and the other consisting of a mixture of contaminants and distillation assistant and separating the distillation assistant from the styrene-containing fraction.

12. That method of recovering relatively pure styrene from crude mixtures comprising styrene and contaminants of similar boiling point, primarily aromatic hydrocarbons having the empirical formula $C_8H_{10}$, which consists in subjecting a mixture containing crude styrene to distillation under pressure substantially less than atmospheric in the presence of glycol monoethyl ether to the extent of not less than about 25% by volume of the crude styrene mixture, recovering from said distillation at least two fractions, one consisting of substantially pure styrene and some of the distillation assistant and the other consisting of a mixture of contaminants and distillation assistant, and separating the distillation assistant from the styrene-containing fraction.

13. In a method for increasing the styrene content of an oil containing styrene and like-boiling non-styrene hydrocarbons, the steps which comprise adding water and an ethylene glycol ether boiling within the range of about 120° to 150° C. to the oil, subjecting this mixture to fractional distillation to take off as distillate an azeotropic mixture consisting predominantly of water and non-styrene hydrocarbons, condensing this distillate to separate water and hydrocarbons into two liquid phases, introducing water into the upper part of the fractionating column, continuing fractional distillation, stratification of distillate, and introduction of water into the column until the greater part of the non-styrene hydrocarbons has been separated from the styrene oil, and thereafter withdrawing as product a styrene oil richer in styrene than the original oil.

KARL H. ENGEL.

REFERENCES CITED

The following references are of record in the file of this patent:

UNITED STATES PATENTS

| Number | Name | Date |
|---|---|---|
| 2,308,229 | Natta | Jan. 12, 1943 |
| 2,380,019 | Bloomer | July 10, 1945 |
| 2,381,996 | Bloomer | Aug. 14, 1945 |
| 2,398,689 | Bloomer | Apr. 16, 1946 |
| 2,411,106 | Petry et al. | Nov. 12, 1946 |

FOREIGN PATENTS

| Number | Country | Date |
|---|---|---|
| 101,321 | Australia | Oct. 26, 1925 |

OTHER REFERENCES

Bureau of Standards Journal of Research, vol. 27, pages 39–63 (July 1941). Copy in Division 25.

Carlson, "Separation of Binary Hydrocarbon Mixtures," Ph. D. Thesis, August 1939, Pennsylvania State College, State College, Pa. Copy in Pennsylvania State College Library. (Pages 56–69 and figures 14 and 15 cited.)